United States Patent
Kurumisawa et al.

(10) Patent No.: US 9,434,363 B2
(45) Date of Patent: Sep. 6, 2016

(54) DECELERATION CONTROL APPARATUS FOR MOTOR VEHICLE

(71) Applicant: DENSO CORPORATION, Kariya, Aichi-pref. (JP)

(72) Inventors: Jin Kurumisawa, Obu (JP); Toyohito Nozawa, Aichi-ken (JP); Tatsuya Namikiri, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 17 days.

(21) Appl. No.: 14/062,031

(22) Filed: Oct. 24, 2013

(65) Prior Publication Data

US 2014/0121928 A1    May 1, 2014

(30) Foreign Application Priority Data

Oct. 25, 2012   (JP) .................................. 2012-235663

(51) Int. Cl.
*B60T 8/1755*        (2006.01)

(52) U.S. Cl.
CPC .......... *B60T 8/1755* (2013.01); *B60T 2201/16* (2013.01)

(58) Field of Classification Search
None
See application file for complete search history.

(56) References Cited

U.S. PATENT DOCUMENTS

| | | | | |
|---|---|---|---|---|
| 5,285,390 A | * | 2/1994 | Haseda | B62D 7/159 701/41 |
| 5,448,481 A | * | 9/1995 | Asanuma | B62D 7/159 701/42 |
| 5,627,756 A | * | 5/1997 | Fukada et al. | 701/70 |
| 5,642,281 A | * | 6/1997 | Ishida | B62D 6/00 701/41 |
| 5,805,449 A | * | 9/1998 | Ito | B60T 8/1755 701/41 |
| 5,944,393 A | * | 8/1999 | Sano | B60T 8/1755 303/146 |
| 5,957,987 A | * | 9/1999 | Sudo et al. | 701/41 |
| 6,081,761 A | | 6/2000 | Harada et al. | |

(Continued)

FOREIGN PATENT DOCUMENTS

JP     10-278762      10/1998
JP     2004-217178    8/2004

(Continued)

OTHER PUBLICATIONS

Office Action dated Oct. 7, 2014 in corresponding Japanese Application No. 2012-235663.

(Continued)

*Primary Examiner* — Rami Khatib
*Assistant Examiner* — David Merlino
(74) *Attorney, Agent, or Firm* — Harness, Dickey & Pierce, P.L.C.

(57) ABSTRACT

When a vehicle runs along a curved path, successive values of a speed limit are calculated based on the yaw rate of the vehicle, and values of acceleration demand are calculated and applied to control the actual vehicle speed based on the speed limit. If commencement of oscillation of the yaw rate and acceleration demand is detected, due to running along the curved path, guard processing is applied to the values of speed limit used to calculate the acceleration demand or is applied to the acceleration demand, such as to prevent the acceleration demand from varying in a direction that would increase the speed limit. Instability of deceleration control due to the oscillation is thereby substantially suppressed.

17 Claims, 7 Drawing Sheets

(56) References Cited

U.S. PATENT DOCUMENTS

| | | | |
|---|---|---|---|
| 6,122,584 A * | 9/2000 | Lin et al. ................. | 701/70 |
| 6,212,465 B1 * | 4/2001 | Sielagoski et al. ........ | 701/72 |
| 6,438,474 B1 * | 8/2002 | Tanaka ............. | B60T 8/1755 |
| | | | 701/41 |
| 6,547,343 B1 * | 4/2003 | Hac ........................ | 303/146 |
| 7,516,008 B2 * | 4/2009 | Fukami ............. | B60T 8/1755 |
| | | | 701/70 |
| 2004/0143416 A1 | 7/2004 | Hattori et al. | |
| 2005/0216164 A1 * | 9/2005 | Sakata .................... | 701/70 |
| 2005/0269874 A1 * | 12/2005 | Ishimoto ................. | 303/146 |
| 2009/0005946 A1 * | 1/2009 | Futamura ........... | B60T 8/1755 |
| | | | 701/70 |
| 2009/0105906 A1 * | 4/2009 | Hackney ............ | B60T 8/1755 |
| | | | 701/38 |
| 2009/0228182 A1 * | 9/2009 | Waldbauer et al. ...... | 701/70 |
| 2011/0060505 A1 * | 3/2011 | Suzuki .............. | B60T 8/1755 |
| | | | 701/41 |
| 2011/0125368 A1 | 5/2011 | Yokota | |
| 2012/0179349 A1 * | 7/2012 | Yamakado ......... | B60T 8/1755 |
| | | | 701/89 |
| 2012/0209489 A1 | 8/2012 | Saito et al. | |
| 2013/0261841 A1 * | 10/2013 | Miyata .............. | B60T 8/17551 |
| | | | 701/1 |

FOREIGN PATENT DOCUMENTS

| | | |
|---|---|---|
| JP | 2006-111184 | 4/2006 |
| JP | 2009-051369 | 3/2009 |
| JP | 2010-174648 | 8/2010 |
| JP | 2011-088576 | 5/2011 |
| KR | 10-2006-0044651 | 5/2006 |
| KR | 10-2007-0072710 | 7/2007 |
| WO | WO2009-142079 | 11/2009 |

OTHER PUBLICATIONS

Office Action dated Oct. 31, 2014 in corresponding Korean Application No. 10-2013-0125023.

* cited by examiner

CURVED SECTION OF TRAVEL PATH

CURVED SECTION OF TRAVEL PATH

CURVED SECTION OF TRAVEL PATH

CURVED SECTION OF TRAVEL PATH

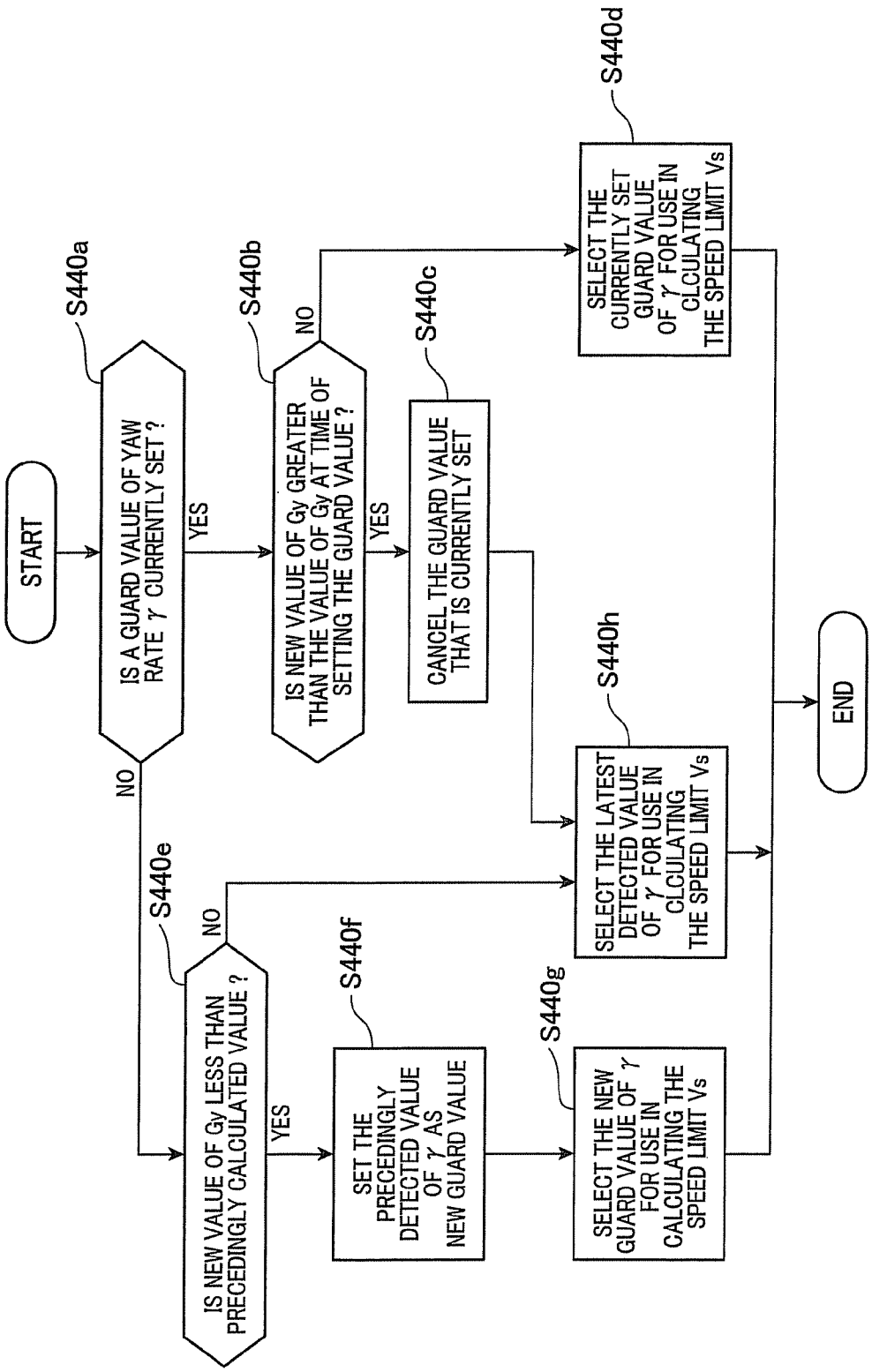

DECELERATION CONTROL APPARATUS FOR MOTOR VEHICLE

CROSS-REFERENCE TO RELATED APPLICATIONS

This application is based on and incorporates herein by reference Japanese Patent Application No. 2012-235663 filed on Oct. 25, 2012.

BACKGROUND OF THE INVENTION

1. Field of Application

The present invention relates to a deceleration control apparatus for executing deceleration control of a motor vehicle in accordance with running conditions of the vehicle.

2. Background Technology

Types of deceleration control apparatus have been hitherto proposed for such a purpose, e.g., as in Japanese patent publication No. 10-278762. Typically, a target value of deceleration is calculated based upon detected values of a quantity such as lateral acceleration, etc., and the apparatus automatically decelerates the vehicle based on that target value.

However while the vehicle is turning (where "turning" here signifies moving along a curved path) with deceleration control being applied, acquired values of a quantity indicative of the turning motion (yaw rate, lateral acceleration, etc), used in calculating the target value of deceleration, may oscillate. Such oscillation (where "oscillation" is used in a general sense, signifying repetitive variations in magnitude) may result due to the configuration of the road on which the vehicle is travelling, the condition of the road surface, the steering angle of the vehicle, etc. This can result in instability (hunting) of the deceleration control, which must be prevented in order to maintain stable motion of the vehicle. However the types of deceleration control apparatus proposed hitherto do not sufficiently prevent such instability while also ensuring a satisfactory speed of control response.

SUMMARY

Hence it is desired to overcome the above problem, by providing a deceleration control apparatus for a motor vehicle whereby the vehicle speed can be automatically controlled to an appropriate value when the vehicle is driven along a curved section of a travel path, and whereby instability of deceleration control can be prevented while ensuring satisfactory speed of control response.

To achieve the above objective the invention provides a deceleration control apparatus for installation on a vehicle, for executing deceleration control of the vehicle based on running conditions of the vehicle including a turning state of the vehicle, with the deceleration control apparatus including turning state acquisition circuitry, control value acquisition circuitry, and guard processing circuitry.

The turning state acquisition circuitry acquires successive values of a turning state quantity which is indicative of the turning state, such as values of yaw rate detected by a yaw rate sensor. Based on the acquired values of the turning state quantity, the control value acquisition circuitry calculates successive values of a control quantity such as an acceleration demand, to be applied in controlling the deceleration. The guard processing circuitry executes guard processing for detecting commencement of oscillation of the turning state quantity and the control quantity, caused by the vehicle running in a special running condition, in particular, caused by running along a curved section of a travel path.

When commencement of the oscillation is detected, a guard value of the turning state quantity or a guard value of the control quantity is established by the guard processing. Prior to detection of the oscillation, deceleration control is executed based upon the successively obtained values of the control quantity. However when commencement of the oscillation is detected, the deceleration control becomes executed based upon the guard value of the control quantity, or upon a value of the control quantity derived based on the guard value of the turning state quantity.

When "hunting" instability of the deceleration control may be produced by oscillation of the control quantity, the invention enables such instability to be effectively suppressed.

More specifically, while deceleration control is executed, successively acquired values of the turning state quantity (e.g., yaw rate) are used to calculate a speed limit, as a limit value of vehicle speed for restricting the lateral acceleration to be within a predetermined boundary value. An acceleration limit (acceleration demand value corresponding to the speed limit) is obtained based on the difference between the speed limit and the actual current speed of the vehicle. From one aspect of the invention, while a guard value of the turning state quantity is set by the guard processing, the speed limit is prevented from varying in a direction of increase, but may only decrease, i.e., the vehicle speed may decrease but is prevented from increasing. Hence, the acceleration demand (acceleration limit value) is stabilized accordingly. Alternatively, the guard processing may be executed such as to set a guard value of the calculated values of the speed limit, to achieve the same effect of stabilization. As a further alternative, the guard processing may be executed such as to set a guard value of the calculated values of the acceleration limit, to achieve the effect of stabilization Preferably, the turning state acquisition circuitry obtains successive values of the lateral acceleration of the vehicle, and the guard processing circuitry initiates the guard processing when it is judged that the absolute value of lateral acceleration exceeds a first predetermined threshold.

Furthermore, the guard processing circuitry is preferably configured to terminate the guard processing when it is judged that successively obtained absolute values of the lateral acceleration have remained below a second predetermined threshold for longer a predetermined continuation interval.

Each value of lateral acceleration may be calculated based on detected values of the yaw rate and speed of the vehicle, produced from respective sensors, or may be detected by a lateral acceleration sensor.

BRIEF DESCRIPTION OF THE DRAWINGS

FIG. 7 is a flow diagram showing details of a guard processing step in the flow diagram of FIG. 4.

DESCRIPTION OF PREFERRED EMBODIMENTS

Figure 1:
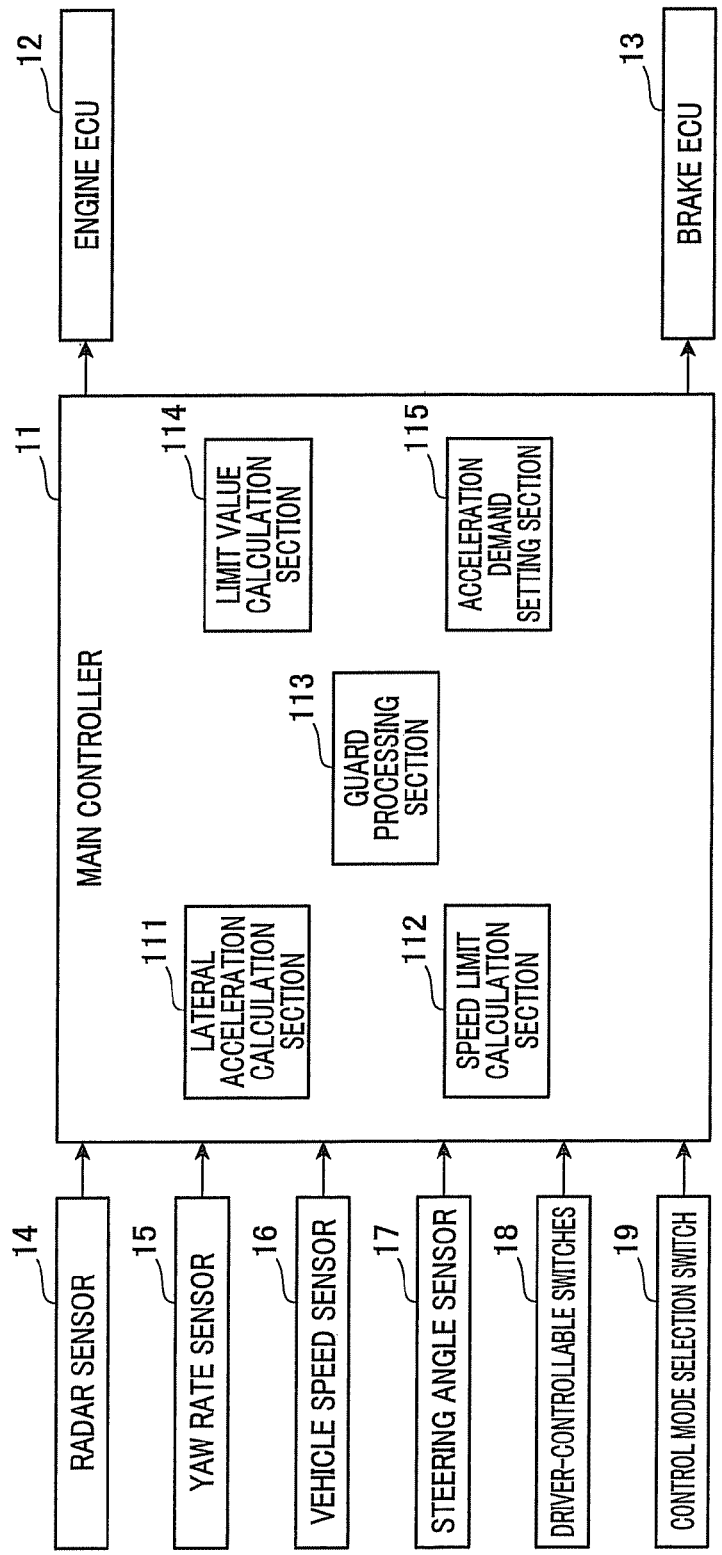
FIG. 1 is a block diagram showing the general configuration of a first embodiment of a deceleration control apparatus.

FIG. 1 is a block diagram showing the general configuration of a first embodiment of a deceleration control apparatus, designated by number 10. The deceleration control apparatus 10 is installed on a host vehicle, as part of an adaptive cruise control system of the vehicle. The adaptive cruise control system serves to control the speed of the host vehicle to match the speed of a preceding vehicle, while limiting the host vehicle speed such as not to exceed an upper limit value that has been set, and to follow the preceding vehicle with a constant degree of inter-vehicle separation. Types of such adaptive cruise control system are now well known, so that only those operations of that system relating to the operation of this embodiment will be described.

As shown, the deceleration control apparatus 10 is formed of a main controller 11, an engine ECU 12, a brake ECU 13, a radar sensor 14, a yaw rate sensor 15, a vehicle speed sensor 16, a steering angle sensor 17, a driver-controllable switches 18 and a control mode selection switch 19.

The main controller 11 is based on a microcomputer, made up of a CPU, ROM, RAM, etc., which controls the operations of the adaptive cruise control system. Deceleration control is performed by execution of programs (processing routines) by the CPU, using various data held in look-up tables, memory maps, etc., which have been stored beforehand in the ROM, and with data necessary for program execution being temporarily held in the RAM.

The engine ECU 12 controls operating conditions of the engine and transmission of the host vehicle in accordance with commands sent from the main controller 11, and the brake ECU 13 controls operation of the vehicle brakes in accordance with commands form the main controller 11. Specifically, the main controller 11 calculates an acceleration demand as a required value of acceleration or deceleration of the vehicle (i.e., a value which may be positive or negative). Control commands in accordance with the acceleration demand are transmitted to the engine ECU 12 and the brake ECU 13. The radar sensor 14 serves to detect the distance between the host vehicle and a target object (e.g., a preceding vehicle), and to detect the direction of the target object relative to the host vehicle, by transmitting waves (e.g., light waves or sound waves) which are reflected from any target object that is within a specific detection zone, and are received by the radar sensor 14.

The yaw rate sensor 15 detects the actual yaw rate of the host vehicle (i.e., the rate of angular rotation about a vertical axis). The vehicle speed sensor 16 detects the actual speed at which the host vehicle is running. The steering angle sensor 17 detects the steering angle of the host vehicle, i.e., the angle to which the driver of the host vehicle (referred to in the following simply as the driver) rotates the steering wheel.

The driver-controllable switches 18 are actuated by the driver for inputting instructions to the adaptive cruise control system which incorporates the deceleration control apparatus 10, indicating the intentions of the driver, e.g., for applying or halting inter-vehicle separation control, etc. The control mode selection switch 19 can be actuated by the driver for selecting a specific control mode from a plurality of available control modes of controlling the inter-vehicle separation, for example, a long inter-vehicle separation mode whereby the inter-vehicle separation or inter-vehicle time interval is made relatively long, a short inter-vehicle separation mode, and an intermediate inter-vehicle separation mode. Here, "inter-vehicle time interval" signifies a time interval expected to elapse between the time point (used as a reference time, point) at which a preceding vehicle passes a specific position and the time point at which the host vehicle will pass that specific position.

The main controller 11 is the main constituent of the deceleration control apparatus 10, and is made up of a lateral deceleration calculation section 111, a speed limited calculation section 112, a guard processing section 113, a limit value calculation section 114 and an acceleration demand setting section 115. These are respective function blocks which are implemented by operations of the CPU of the main controller 11, through execution of the stored programs.

Successive values of lateral acceleration Gγ of the host vehicle are calculated by the lateral deceleration calculation section 111, based on the values of yaw rate γ and vehicle speed detected by the yaw rate sensor 15 and vehicle speed sensor 16 respectively, i.e., the combination of the yaw rate sensor 15 and vehicle speed sensor 16 serves to acquire successive values of yaw rate γ and lateral acceleration Gγ.

When the vehicle runs along a curved path, with deceleration control being applied, successive values of a speed limit Vs are derived, with Vs being a limit value of vehicle speed for restricting the lateral acceleration of the vehicle from exceeding a predetermined boundary value. Successively updated values of the speed limit Vs are obtained by the speed limit calculation section 112 as described hereinafter, based on the turning state of the vehicle, i.e., with this embodiment, based on detected values of the yaw rate γ.

When the host vehicle is running along such a curved travel path and it is detected that the lateral acceleration Gy exceeds a predetermined value, the guard processing section 113 executes a form of processing referred to in the following as guard processing, for detecting oscillation of the yaw rate γ and the lateral acceleration Gy, and (if the oscillation is detected) suppressing instability ("hunting") in deceleration control that may be caused by the oscillation. With the guard processing, when it is detected that oscillation is commencing, the value of yaw rate γ at that time is set as a guard value. Thereafter, the guard value becomes the value of yaw rate γ actually used in calculating the speed limit Vs, in place of the successively detected values of γ. However if the yaw rate γ increases such as to exceed the guard value that is currently set, a new (higher) guard value of yaw rate γ is set, and a correspondingly lower value of the speed limit Vs is thereby determined.

Hence, the speed limit Vs is prevented from varying such as to increase above a value determined by the guard value which is currently set, but may become decreased. The effects of the oscillation of the yaw rate γ upon the deceleration control can thereby be substantially suppressed.

While deceleration control is being applied, the limit value calculation section 114 successively updates a calculated value of acceleration limit, based on the difference between the speed limit Vs and the actual speed of the host vehicle as detected by the vehicle speed sensor 15, i.e., the acceleration limit is a value of acceleration demand for bringing the actual speed of the host vehicle into coincidence with the speed limit Vs.

The acceleration demand setting section 115 sets the acceleration demand as a positive or negative value expressing a required amount of acceleration or deceleration to be imparted to the drive wheels of the host vehicle. The acceleration demand value may be set by the acceleration demand setting section 115 based on operating conditions of the vehicle and on conditions that have been set for the adaptive cruise control system, or set as the acceleration limit value calculated by the limit value calculation section 114. An example of setting the acceleration demand is described in the following.

Description of Operation

With this embodiment, the extent of inter-vehicle separation established by the adaptive cruise control system is determined by the vehicle driver, by setting operating conditions through actuations of the driver-controllable switches 18 and the control mode selection switch 19, etc. When the condition of following a preceding vehicle becomes lost (for example, when the preceding vehicle changes from running in the same traffic lane as the host vehicle to running in a different lane) the host vehicle becomes controlled by the adaptive cruise control system to accelerate in accordance with the specific demand value of acceleration until a target speed is attained, and hereafter maintain running at the target speed.

However when the host vehicle commences running on a curved section of the travel path, deceleration control is applied if necessary by the deceleration control apparatus 10 for ensuring that the host vehicle will run in a stable condition around the curve.

In the following, the operation of the deceleration control apparatus 10 is described referring to the drawings.

Figure 2A:
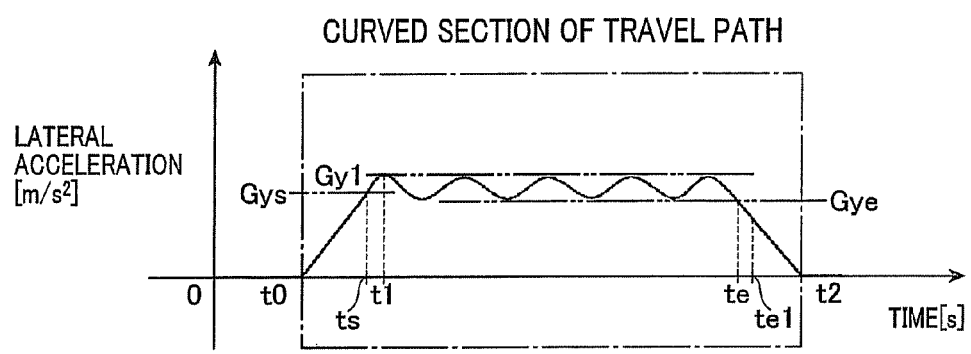
FIG. 2A is a timing diagram of variation of lateral acceleration of a vehicle, for use in describing the operation of the first embodiment.
Figure 2B:
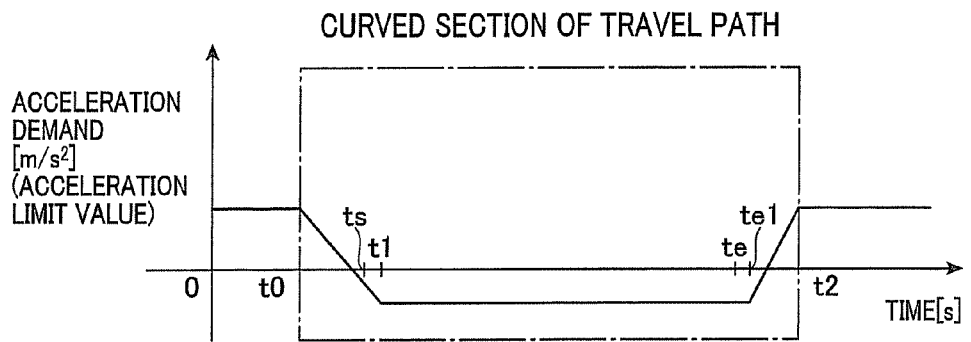
FIG. 2B is a corresponding timing diagram of variation of acceleration demand.

FIG. 2A is a timing diagram of an example of variation of the lateral acceleration Gy, when the host vehicle enters and subsequently exits a curved section of a travel path. FIG. 2B is a corresponding timing diagram of variation of the acceleration demand. During deceleration control for traveling around a curved path, the acceleration demand may or may not be established as the acceleration limit value. That is, during execution of deceleration control, the adaptive cruise control system may (e.g., due to slowing of a preceding vehicle) determine a target value of vehicle speed that is lower than the speed limit Vs. When that occurs, an appropriate acceleration demand value will be applied instead of the acceleration limit value. However, in the example of FIGS. 2A, 2B it is assumed that values of acceleration limit (acceleration demand in accordance with values of speed limit Vs) are applied during the interval t0 to t2.

With this embodiment, successive values of lateral acceleration Gy are calculated based on detected values of yaw rate γ from the yaw rate sensor 15 and detected values of vehicle speed from the vehicle speed sensor 15. However it would be equally possible to provide a lateral acceleration sensor for obtaining values of lateral acceleration Gy, with similar timing diagrams to those of FIGS. 2A, 2B being obtained. It is assumed that oscillation of the yaw rate γ and lateral acceleration Gy occurs when the host vehicle runs along the curved section of the travel path. Occurrence or non-occurrence of such oscillation, and the form of oscillation, depended upon factors such as the configuration of the travel path, the condition of the road surface, the steering angle of the vehicle, etc.

If such oscillation of the yaw rate and lateral acceleration occurs, similar oscillation will occur for quantities that are calculated based thereon, i.e., the speed limit Vs will oscillate, and hence so also will the acceleration limit value. This can cause instability (hunting) of deceleration control. However with this embodiment as shown in FIG. 2B the acceleration limit value is substantially stabilized by means of guard processing.

The host vehicle is indicated as entering the curved section of the travel path at time point t0, and exiting at time point t2. Within the interval t0~t2, deceleration control is applied as follows:

(1) (Interval t0 to ts) Following time point t0, the deceleration control apparatus 10 applies deceleration control based on the detected yaw rate γ. This is continued until the absolute (calculated) value of lateral acceleration Gy reaches a predetermined initial threshold value Gys, at time point ts.

(2) (Guard processing: interval ts to te1) Following time point ts, the lateral acceleration Gy begins to decrease at time point t1. The yaw rate γ detected at that time point is set as a guard value γ1 (corresponding to a value Gy1 of lateral acceleration Gy). With this example, the lateral acceleration Gy does not subsequently exceed Gy1. At time point te, the absolute value of lateral acceleration Gy becomes less than a final threshold value Gye.

(3) (Following te1) When it is judged that the absolute value of lateral acceleration Gy has remained below Gye for longer than a predetermined duration tc0, the guard processing is ended at time point te1, i.e., the interval of guard processing extends from ts to te1. In the interval from te1 to t2 the speed limit Vs varies inversely with respect to successively decreasing detected values of yaw rate γ, hence the acceleration limit value increases successively until the curved section is exited (at t2) and deceleration control is ended.

The stabilization of the speed limit Vs obtained with this example has the following effect. Prior to entering the curved section (prior to t0), the acceleration demand value is such as to maintain the vehicle at a constant speed, determined by the adaptive cruise control system. The lateral acceleration Gy is substantially zero. When the vehicle enters the curved section (time point t0), the lateral acceleration Gy rises above zero so that deceleration control commences and values of speed limit Vs are calculated. Vs successively decreases in accordance with increase of Gy, and the acceleration demand (acceleration limit value) decreases accordingly.

The following relationship exists between the lateral acceleration Gy, angular slip velocity dβ, yaw rate γ and the speed V at which the vehicle is running:

$$Gy = V(d\beta + \gamma) \tag{F1}$$

During normal running conditions the lateral slip angle dβ is small. Hence the factor dβ in equation (F1) can be ignored, so that equation (F2) below can be obtained from equation (F1). The lateral acceleration Gy may thus be obtained by calculation, using detected values of yaw rate γ and vehicle speed V. Since Gy and γ are related as shown by equation (F2), when the yaw rate γ oscillates, the lateral acceleration Gy oscillates correspondingly.

$$Gy = V\gamma \tag{F2}$$

The speed limit Vs can be calculated from the following equation (F3), based on the above equation (F2), the yaw rate γ, and a lateral acceleration boundary value Gyc (a predetermined standard value). A value of acceleration limit can thereby be calculated based on the difference between the speed limit Vs and the vehicle speed V.

$$Vs = Gyc/\gamma \tag{F3}$$

The equation (F3) can also be converted to the following equation (F4), based on the above equation (F1) and the actual (i.e., detected) speed Vr of the vehicle.

$$Vs = Vr \cdot Gyc/Gy \qquad (F4)$$

The yaw rate γ corresponds to an information quantity indicative of a turning state of the host vehicle, as set out in the appended claims. However it will be understood from equation (F4) that the turning state can be similarly expressed based on detected values of the lateral acceleration Gy and of the actual vehicles speed Vr.

As shown in the timing diagram of FIG. 2B, after the host vehicle commences running along a curved section of the travel path (time point t0), deceleration control is applied in the interval t0~t1 in accordance with values of speed limit Vs determined by equation (F3) above. Hence the acceleration demand (acceleration limit value) decreases monotonically from positive to negative values. Since no filtering (smoothing) processing is applied to the acceleration demand values or to values used in calculating the acceleration demand, a rapid transition can be made to deceleration control when the curved section of the travel path is entered.

Deceleration is executed appropriately in accordance with the running conditions of the vehicle, by applying the vehicle brakes under control of the brake ECU 13 and/or by engine braking under control of the engine ECU 12.

In the example of FIGS. 2A, 2B, after the yaw rate γ and the lateral acceleration Gy attain respective values γ1 and GY1 at time point t1, the detected values of yaw rate γ (and hence of lateral acceleration Gy) begin to decrease. Thus, t1 is detected as the time point of commencement of oscillation of γ and Gy, i.e., following time point t1, Gy repetitively varies by increasing and decreasing to/from values of similar magnitude to Gy1. During that oscillation, the yaw rate γ (as used in calculating the speed limit Vs), is prevented from falling below the guard value γ1, so that the speed limit Vs becomes preventing from increasing above the value determined at time point t1. As a result, fluctuations of the acceleration limit value due to oscillation of the yaw rate and lateral acceleration are substantially suppressed.

The guard processing is ended at a time point te, after the lateral acceleration Gy has become less than the final threshold value Gye at time point te1, i.e., when the condition Gy<Gye has continued for longer than a predetermined duration Tc0. That is: te1−te>tc0.

When the host vehicle exits the curved section of the travel path at time point t2, changeover from deceleration control to normal control of acceleration by the adaptive cruise control system can be rapidly executed, since as described above, smoothing (filtering) processing is not applied for reducing effects of the oscillation of the yaw rate γ and lateral acceleration Gy on the deceleration control.

As can be understood from the above, after it is detected that the lateral acceleration Gy has exceeded a predetermined threshold value (Gys), guard processing is executed. In the guard processing, a guard value of yaw rate γ becomes set, which defines a corresponding value of the speed limit Vs. The acceleration limit value is determined based on the difference between the speed limit Vs and the currently detected speed of the vehicle. While a guard value of the yaw rate γ is set, the speed limit Vs cannot vary such as to increase from the value corresponding to that guard value. Hence, fluctuation of the acceleration limit value (acceleration demand) due to oscillation of the yaw rate and lateral acceleration is substantially suppressed, ensuring stability of deceleration control.

Figure 3A:
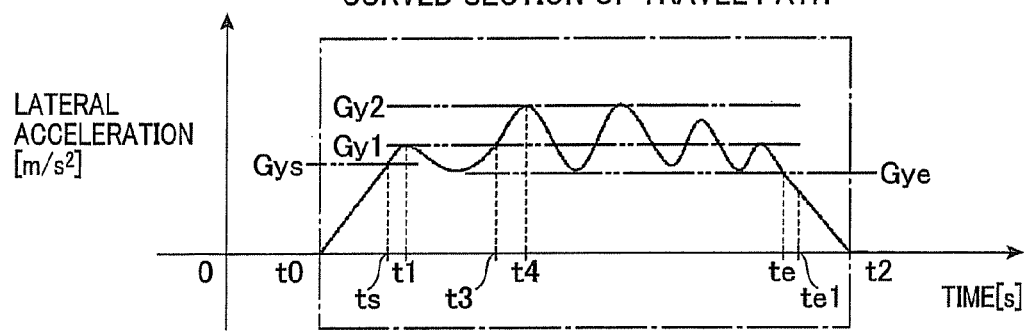
FIGS. 3A and 3B are timing diagrams corresponding to FIGS. 2A, 2B respectively, for the case a second example of variation of lateral acceleration of the vehicle.

FIG. 3A shows a timing diagram similar to FIG. 2A, but for the case in which after entering a curved section of the travel path, the oscillation of the lateral acceleration Gy reaches a first peak amplitude Gy1 at time point t1, then attains a second peak value, greater than Gy1, at time point t4. In this case, a guard value Gy1 is initially established at time point t1 as described for the case of FIGS. 2A, 2B, however that guard value is released when the lateral acceleration Gy exceeds Gy1. Thereafter, values of the speed limit Vs are calculated based on the detected values of yaw rate γ in the interval from t3~t4. At time point t4, when the lateral acceleration Gy begins to decrease from the value Gy2, the corresponding value of yaw rate γ (γ2) becomes set as a new guard value. It can thus be understood that the guard processing prevents increase of the speed limit Vs from a value determined by an initially set guard value (e.g., γ1), but permits subsequent decrease of Vs (e.g., to a value corresponding to γ2).

Figure 3B:
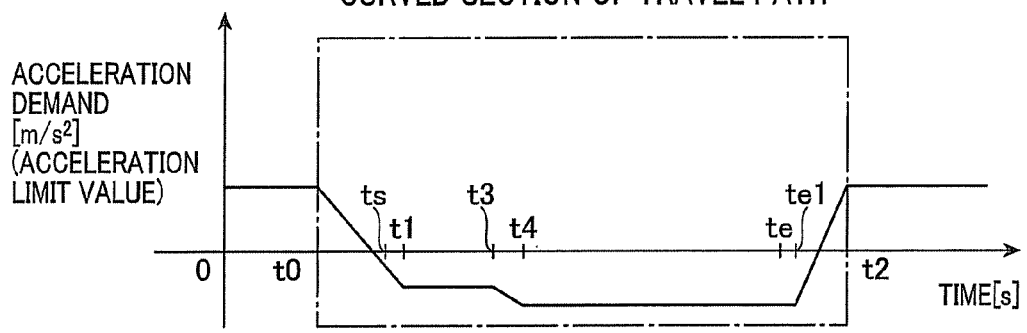

The resultant variation of the acceleration limit value (acceleration demand) is shown in the timing diagram of FIG. 3B. In this case too, the acceleration limit value remains substantially stable, irrespective of oscillation of the yaw rate and of lateral acceleration.

Figure 4:
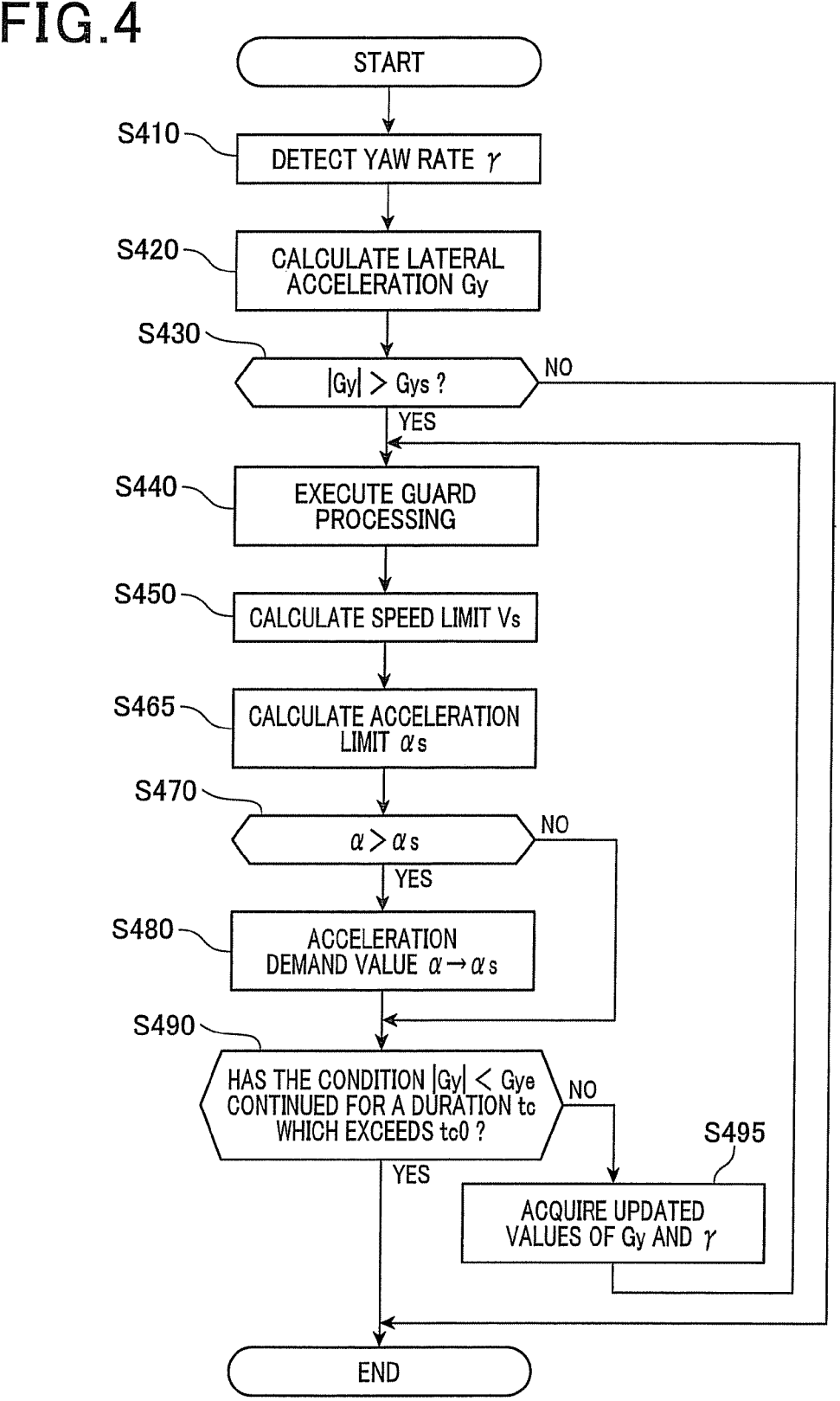
FIG. 4 is a flow diagram of a processing routine executed by the first embodiment.

FIG. 4 is a flow diagram of a processing routine periodically executed by this embodiment, for performing the above operations.

Firstly in step S410, the current value of yaw rate γ is detected based on the output from the yaw rate sensor 15. Next in step S420, the corresponding value of lateral acceleration Gy is calculated based on the detected values of γ and vehicle speed Vr.

In step S430, a decision is made as to whether the absolute value of lateral acceleration Gy exceeds the initial threshold value Gys. If it is not exceeded (NO decision), this execution of the processing routine is terminated. However if Gys is judged to be exceeded (YES in step S430), indicating that guard processing is to be applied, step S440 is then executed.

In step S440, processing is executed to obtain a value of yaw rate γ for use in calculating the speed limit Vs. This value of γ is obtained either as the currently detected value (as in the time interval ts~t1 in FIG. 2A), or as a guard value (as in the time interval t1~te1 in FIG. 2A).

FIG. 7 is a flow diagram of the contents of step S440. First (step S440a) a decision is made as to whether a guard value of yaw rate γ is currently established. If so, step S440b is then executed, to judge whether the latest value of lateral acceleration Gy exceeds the value obtained at the time point when the guard value was set. If a NO decision is made, the guard value of γ is selected (step S440d) to be applied in the calculation of step S450.

If the latest value of Gy does exceed the value obtained when the guard value was set (YES decision in step S440b), that guard value is cancelled (step S440c). The latest acquired value of γ is then selected (step S440h) to be applied in the calculation of step S450. If it is judged in step S440a that no guard value is currently established, S440e is then executed to judge whether the latest obtained value of lateral acceleration Gy exceeds the precedingly obtained value. If so, step S440f is then executed, while otherwise (NO decision in step S440e), step S440h is executed as described above. In step S440f, the precedingly calculated value of yaw rate γ is set as a new guard value, then (step S440g) that new guard value is selected to be applied in the calculation of step S450.

Following step S440, in step S450 of FIG. 4, the value of yaw rate γ selected in step S440 is applied (equation F3 above) to calculate the speed limit Vs. Step S460 is then executed in which an acceleration limit value αS is derived based on the difference between the calculated speed limit Vs and the actual speed Vr of the host vehicle as detected by the vehicle speed sensor 15.

In step S470, a designates a value of acceleration demand which is currently determined by the adaptive cruise control system based on the conditions which have been set for that system and on the operating conditions of the vehicle, (i.e., based on the states of the accelerator, brakes and transmission, the speed which has been set for cruise control, the value set for the intra-vehicle separation distance or separation time interval, etc.). In step S470, a decision is made as to whether the acceleration demand a exceeds (is more positive than) the acceleration limit value as obtained in step S465.

If the acceleration demand a exceeds the acceleration limit value as (YES in step S470), step S480 is then executed, in which a is replaced by as. The acceleration limit value as is thereby applied in controlling the vehicle speed. Step S490 is then executed.

However if a does not exceed as (NO in step S470), (i.e., the adaptive cruise control system is specifying a lower target value of speed than the speed limit Vs) step S490 is then executed, with step S480 being skipped, so that the vehicle speed is controlled based on the acceleration demand a.

In step S490 a decision is made as to whether the absolute value of lateral acceleration Gy has remained less than the final threshold value Gye during an interval Tc which exceeds the predetermined duration Tc0. If not (NO in step S490), step S495 is then executed in which the latest detected values of yaw rate γ and vehicle speed Vr are acquired, and an updated value of lateral acceleration Gγ is calculated based on these. Step S440 is then returned to, and the sequence of steps S440 to S495 is repeated successively, until the duration Tc0 is judged to be exceeded (YES in step S490). This execution of the processing routine is then ended.

Effects

As described above, when the host vehicle runs along a curved section of the travel path, the successively detected values of yaw rate γ (and hence the calculated values of lateral acceleration Gγ) may oscillate. Thus, if control values used in deceleration control were to be derived directly based on such fluctuating values of yaw rate γ, the deceleration control could become unstable, i.e., control "hunting" could occur. With the above embodiment, such instability is prevented by the deceleration control apparatus 10, by setting a guard value of the yaw rate γ when oscillation is detected, and calculating the speed limit Vs based on that guard value. The speed limit Vs is thereby prevented from varying in a direction of increase from the value corresponding to the guard value of γ. The acceleration demand value is determined in accordance with the difference between the actual vehicle speed Vr at that time and the speed limit Vs. Fluctuation of the acceleration demand (resulting in control "hunting") is thus substantially suppressed, without requiring use of smoothing (filtering) processing. It can hereby be ensured that when the host vehicle enters and exits a curved section of the travel path, deceleration control can be rapidly initiated and rapidly terminated while also ensuring stability of motion of the vehicle.

As recited in the appended claims, a turning state quantity corresponds to the yaw rate of the above embodiment, and a control quantity corresponds to the acceleration demand.

Alternative Embodiments

The present invention is not limited to the above embodiment, and various alternative embodiments may be envisaged, examples of which are described in the following. Furthermore, it would be possible to combine two or more of the described embodiments, or parts of these embodiments, with such combinations falling within the scope claimed for the invention.

Firstly, with the first embodiment above, the speed limit Vs is calculated based upon the yaw rate γ. However it would be possible to calculate Vs based upon both the lateral acceleration Gγ and yaw rate γ.

Furthermore, it would be possible to compare the absolute value of the yaw rate γ with a predetermined initial threshold value and final threshold value, for determining an interval in which guard processing is executed, instead of comparing absolute values of lateral acceleration with predetermined threshold values (Gys and Gye) as with the above embodiment.

Furthermore, the deceleration control apparatus could be provided with a lateral acceleration sensor. In that case, instead of calculating the lateral acceleration Gγ based on the yaw rate γ, the lateral acceleration Gy could be detected directly, and applied (equation F4 above) in conjunction with the detected vehicle speed Vr to calculate the speed limit Vs. If necessary, the calculated values could be corrected based on the output from the steering angle sensor 17.

As a further alternative, it would be possible to calculate values of the yaw rate γ and/or the lateral acceleration Gy based upon the outputs from the vehicle speed sensor 15 and the steering angle sensor 17, for use in calculating Vs. As a further alternative, instead of using the yaw rate sensor 15 or a lateral acceleration sensor (or in conjunction with either or both of these), it would be possible to employ information indicative of the vehicle motion that is obtained from a camera installed in the host vehicle, i.e., a camera provided for capturing images of the surroundings of the vehicle, for use in automatic white-line recognition purposes, etc.

Moreover, instead of setting guard values of the yaw rate γ (or lateral acceleration Gy), it would be possible to set guard values of the speed limit Vs, or of the acceleration limit αs, with effects similar to those of the above embodiment being obtainable.

Figure 5:
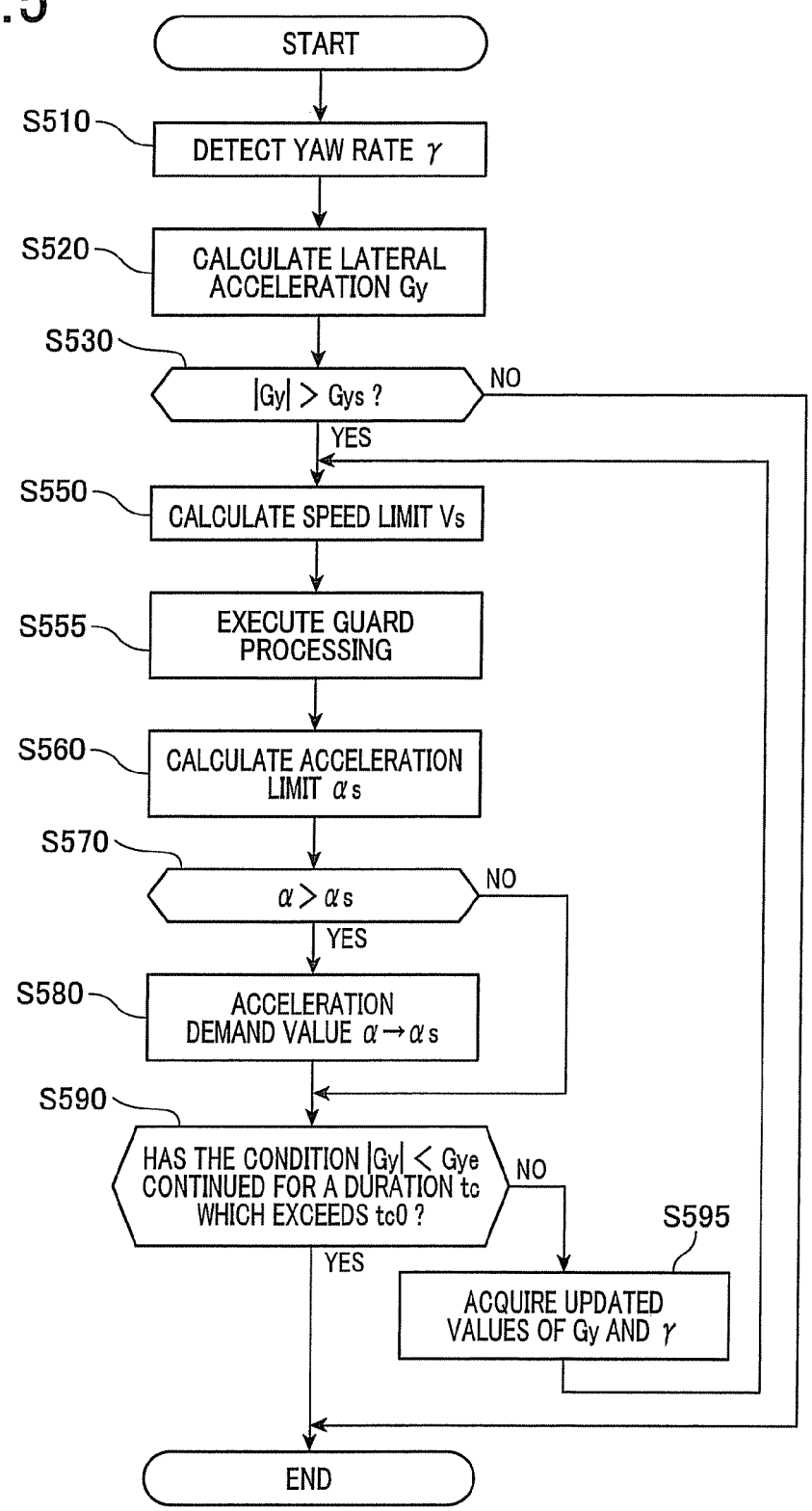
FIG. 5 is a flow diagram of a processing routine executed by a first alternative embodiment.
Figure 6:
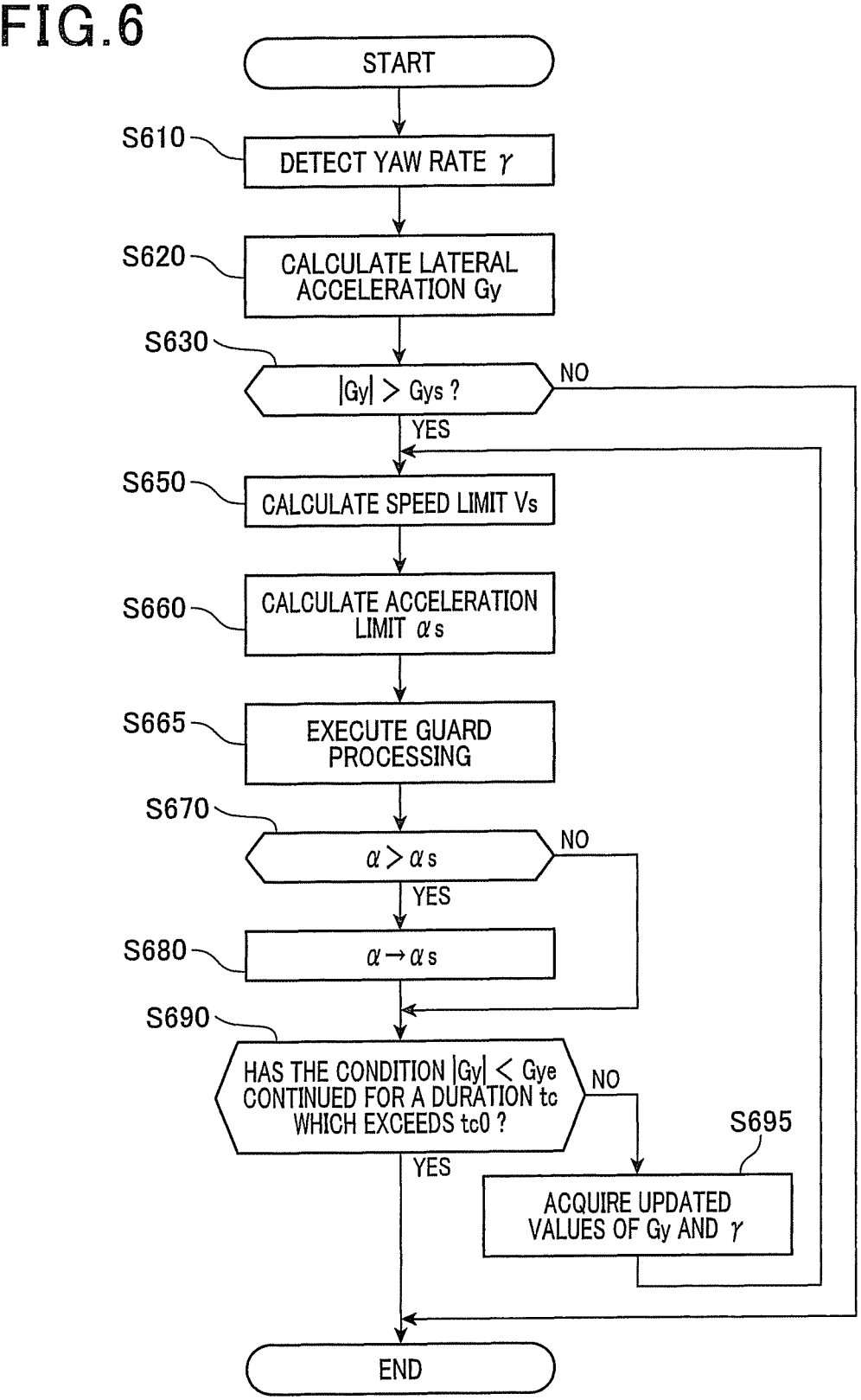
FIG. 6 is a flow diagram of a processing routine executed by a second alternative embodiment.

FIGS. 5 and 6 are flow diagrams of processing executed by the latter alternative embodiments, each being a partial modification of the flow diagram of FIG. 4.

With the first alternative embodiment, in FIG. 5, a guard value is set for the speed limit Vs by the guard processing. In each execution of step S550, an updated value of speed limit Vs is calculated based on the latest obtained values of yaw rate γ, as described for the first embodiment. In the guard processing of step S555, after it has been detected that the initial threshold value Gys of the lateral acceleration Gy has been exceeded, and it is detected thereafter that Gy is commencing to decrease, the value of speed limit Vs obtained at that time point is set as a guard value of Vs. When such a guard value has been set, it is selected to be applied in calculating the acceleration limit value as in step S560. If a guard value of Vs is not currently set, then the latest value of Vs (calculated based on the latest obtained value γ) is selected to be used in step S560 to calculate the acceleration limit αs. In other respects, the processing of this embodiment is identical to that of the first embodiment.

In FIG. 5, steps S510~S530, S550 and S560~595, respectively correspond to steps S410~S430, S450 and S460~495 in FIG. 4, and the above description of steps S410~S430, S450 and S460~495 in FIG. 4 is applicable to steps S510~S530, S550 and S560~595 of FIG. 5.

With the second alternative embodiment, as shown in the flow diagram of FIG. 6, guard processing is applied (in step S665) to values of the acceleration limit as which are calculated based on the speed limit Vs. Each value of Vs and corresponding value of as is calculated as described for the first embodiment. In this case, after the initial threshold value Gys has been exceeded, when it is judged that the lateral acceleration Gy is commencing to decrease, the value of acceleration limit as obtained at that time point is set as a guard value. That is, the actually utilized value of as is prevented from varying (from the guard value) in a direction that would increase the vehicle speed. In each execution of the succeeding steps S670, S680, if a guard value of acceleration limit as is currently set, that guard value is applied in the judgement step S670, while otherwise, the most recently calculated value of αs (obtained in step S660) is applied in the judgement step S670. In other respects, the operation of this embodiment is identical to that of the first embodiment.

In FIG. 6, steps S610~S630, S650 and S670~695 correspond to steps S410~S430, S450 and S470~495 in FIG. 4, and the above description of steps S410~S430, S450 and S470~495 in FIG. 4 is applicable to steps S610~S630, S650 and S670~695 in FIG. 6.

Furthermore, the invention is not limited to the form of guard processing described for the above embodiments, which, when a guard value has been set, prevent only variation of the vehicle speed in a decreasing direction. It would be equally possible to apply the guard processing such as to guard against both increase and decrease of the vehicle speed. That is, changes of the guard value such as to lower the speed limit Vs (as in the example of FIG. 3A) would not be permitted.

What is claimed is:

1. A deceleration control apparatus for installation on a vehicle, said deceleration control apparatus executing deceleration control based on running conditions of the vehicle including a turning state of the vehicle, said deceleration control apparatus comprising:
   turning state acquisition circuitry configured for acquiring successive values of a turning state quantity indicative of said turning state, and
   control value acquisition circuitry configured for deriving successive values of a control quantity for executing said deceleration control, the control quantity values being respectively derived based on said acquired values of the turning state quantity;
   wherein said deceleration control apparatus comprises guard processing circuitry configured for executing guard processing during execution of said deceleration control, said guard processing comprising:
   detecting a commencement of oscillation of said turning state quantity while said vehicle is running along a curved section of a route,
   when said commencement of oscillation is detected, establishing a guard value of said turning state quantity as a value not exceeding a currently acquired value of said turning state quantity,
   prior to detection of said oscillation commencement, executing said deceleration control based upon said successive values of said control quantity derived by said control value acquisition circuitry, and
   subsequent to detection of said oscillation commencement, executing said deceleration control based upon a value of said control quantity derived from said guard value of the turning state quantity.

2. The deceleration control apparatus as claimed in claim 1, wherein:
   during execution of said deceleration control, successive values of a speed limit are derived in accordance with said successive values of said turning state quantity, and successive values of said control quantity are derived based on said values of speed limit; and
   execution of said guard processing prevents increase of said vehicle speed, by preventing variation of said speed limit in a direction of increase.

3. The deceleration control apparatus as claimed in claim 1, wherein said turning state quantity comprises a lateral acceleration of said vehicle, and wherein said guard processing circuitry is configured to initiate said guard processing when an absolute value of said lateral acceleration exceeds a first predetermined threshold.

4. The deceleration control apparatus as claimed in claim 3, wherein said guard processing circuitry is configured to terminate said guard processing when successively obtained absolute values of said lateral acceleration have remained below a second predetermined threshold for longer than a predetermined continuation interval.

5. The deceleration control apparatus as claimed in claim 3 wherein said turning state quantity comprises a yaw rate of said vehicle.

6. The deceleration control apparatus as claimed in claim 5, comprising a yaw rate sensor, wherein values of said yaw rate are detected by said yaw rate sensor.

7. The deceleration control apparatus as claimed in claim 3 comprising a vehicle speed sensor, and a yaw rate sensor for obtained detected values of yaw rate of said vehicle, wherein values of said lateral acceleration are calculated based on said detected values of yaw rate in conjunction with values of vehicle speed detected by said vehicle speed sensor.

8. The deceleration control apparatus as claimed in claim 1, wherein said control quantity comprises an acceleration demand and wherein said deceleration control apparatus determines a speed of said vehicle by selectively effecting acceleration and deceleration of said vehicle in accordance with said acceleration demand.

9. The deceleration control apparatus as claimed in claim 8 wherein said acceleration demand is calculated based on a difference between an actual speed of said vehicle and a speed limit and wherein in executing said guard processing, said guard processing circuitry:
   while said guard value of turning state quantity is not established, derives successive values of said speed limit based on successively acquired values of lateral acceleration or of yaw rate; and
   while said guard value of turning state quantity is established, derives said successive values of speed limit based on a guard value of lateral acceleration or on a guard value of yaw rate.

10. The deceleration control apparatus as claimed in claim 9 wherein said guard processing circuitry is configured to:
    detect a first time point as a time point at which respective absolute values of said successively acquired values of lateral acceleration or of said yaw rate begin to decrease, following of said guard processing, establish a guard value of said lateral acceleration or of said yaw rate as an absolute value acquired at said first time point;

prior to said first time point, apply said successively acquired values of said lateral acceleration or of said yaw rate in deriving said successive values of speed limit; and subsequent to said first time point, apply said guard value in place of said successively acquired values of lateral acceleration or of said yaw rate, to derive said successive values of said speed limit.

11. The deceleration control apparatus as claimed in claim 1, wherein said establishing of said guard value of said turning state quantity does not include the use of a low-pass filter.

12. The deceleration control apparatus as claimed in claim 11, wherein said turning state quantity includes at least one of a detected yaw rate and a ratio of a detected lateral acceleration to a detected speed of said vehicle.

13. The deceleration control apparatus as claimed in claim 1, wherein said turning state quantity includes at least one of a detected yaw rate and a ratio of a detected lateral acceleration to a detected speed of said vehicle.

14. The deceleration control apparatus as claimed in claim 1, wherein said deceleration control is executed to control a vehicle speed to ensure a lateral acceleration of the vehicle does not exceed a maximum allowable value.

15. The deceleration control apparatus as claimed in claim 1, wherein said guard value of said turning state quantity comprises a yaw rate of said vehicle.

16. The deceleration control apparatus as claimed in claim 15, wherein said guard value of said turning state quantity is increased based on an increased yaw rate of said vehicle.

17. The deceleration control apparatus as claimed in claim 1 wherein said turning state quantity comprises a yaw rate of said vehicle.

* * * * *